Aug. 12, 1969     A. S. HUKIN     3,461,220
WIRING SECTION FOR AN ELECTRICAL WIRING SYSTEM
Filed Oct. 10, 1966     2 Sheets-Sheet 1
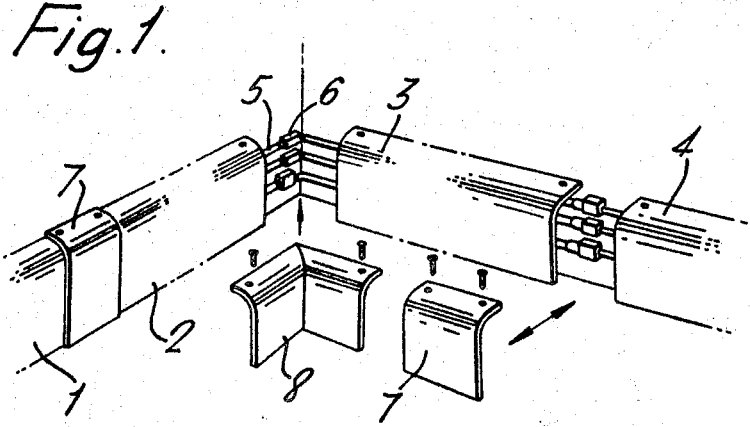
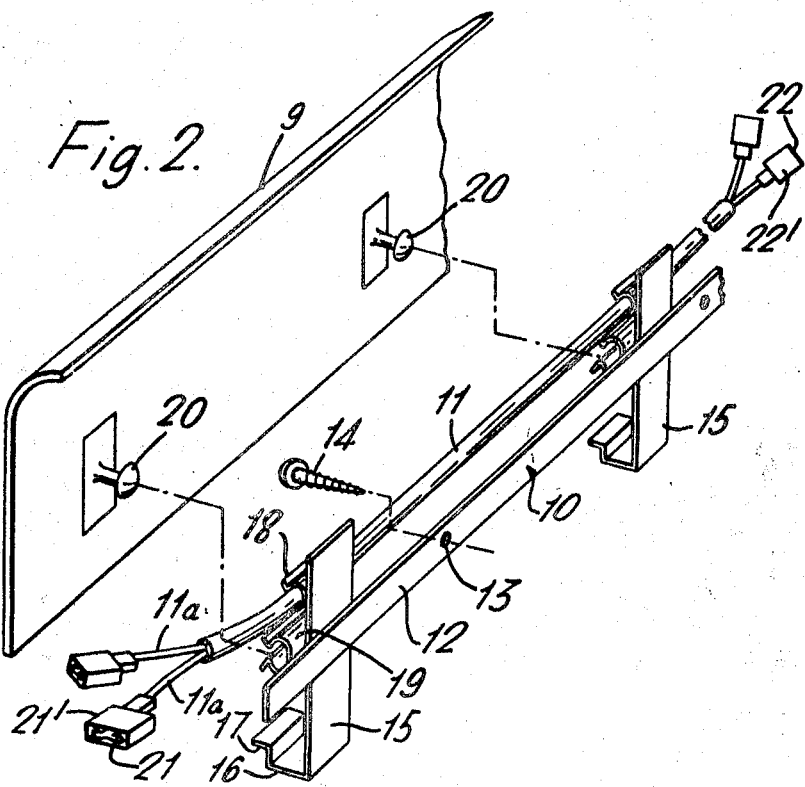

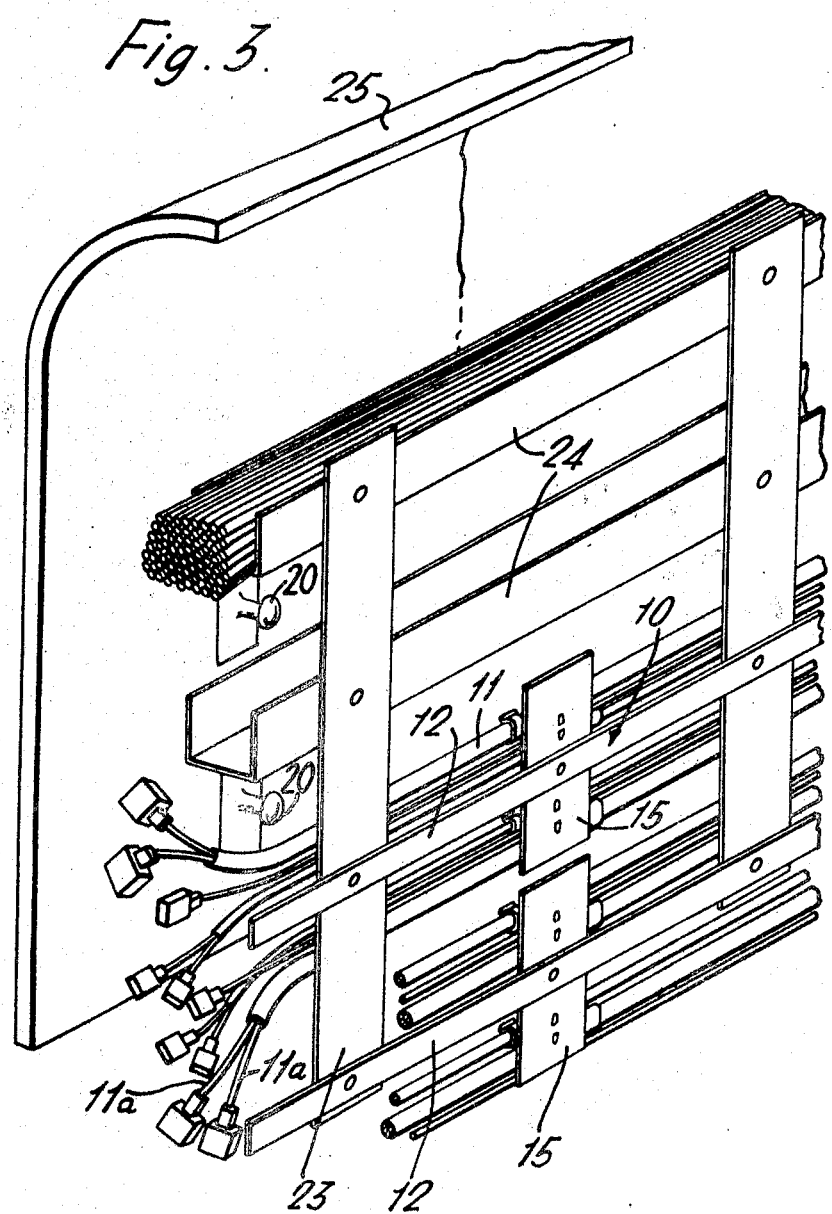

United States Patent Office 3,461,220
Patented Aug. 12, 1969

3,461,220
WIRING SECTION FOR AN ELECTRICAL WIRING SYSTEM
Arthur Shepherd Hukin, Cobham, England, assignor, by mesne assignments, to F. C. Blackwell and Company Limited, Liverpool, England
Filed Oct. 10, 1966, Ser. No. 585,527
Claims priority, application Great Britain, Oct. 27, 1965, 45,441/65
Int. Cl. H02g 3/04, 3/10
U.S. Cl. 174—48                                       5 Claims

ABSTRACT OF THE DISCLOSURE

The present invention concerns a wiring section for a building wiring system built up of a number of modular sections arranged end to end. The wiring section comprises a preterminated insulated conductor wire extending from end to end of the section for releasable connection with complementary terminals of a conductor wire of an adjacent section. The conductor wire is mounted in a plurality of lead support means spaced longitudinally of the electrical conductor and secured at spaced intervals to a mounting strip arranged to hold the lead support means in predetermined spaced relation. A cover member or skirting section is releasably secured to the mounting strip so that the cover member or skirting section may be moved without distributing the wiring in the support means.

---

This invention relates to electrical wiring systems for buildings and is particularly concerned with systems which may be prefabricated in kit form for installation in domestic buildings as is disclosed in copending patent application, Ser. No. 580,764, filed Sept. 20, 1966.

In this earlier patent application there has been disclosed an electrical wiring system comprising a plurality of elongated ducting sections, each ducting section having mounting means for releasably securing the ducting section to a building wall, each ducting section having lead support means for releasably supporting an insulated conductor lead extending longitudinally of the section, each ducting section having a conductor lead releasably supported in the lead support means and extending longitudinally of the section substantially throughout its length and the lead at each end being terminated by an electrical connector releasably engageable with a complementary electrical connector at the end of a lead of another section, boot means for insulating mating complementary electrical connectors, and a ducting lapping section for lapping the ends of adjacent ducting sections arranged end to end, releasably securable to the ends of the adjacent ducting sections.

In a disclosed embodiment of this earlier patent application a skirting member for mounting in a room of a building contains multiple clip members each including one clip for releasable connection to a headed stud secured to the wall of the room and other clips supporting preterminated conductor leads of length corresponding to that of the skirting section. In wiring a building with the system of the earlier patent application the pre-wired skirting sections are arranged end to end and secured to the appropriate building walls, respective conductor leads of each section are thereafter interconnected by mating releasable connectors at the ends of the conductor leads.

According to the present invention a wiring section for a wiring system comprises a cover member, a mounting member, means for securing said cover member to said mounting member, and lead support means carrying at least one electrically insulated flexible electric conductor lead corresponding in length to said cover member and terminated at both ends by electrical connector means. Said mounting member comprises a mounting strip having means for mounting same on a building wall, and said lead support means comprises at least one row of lead support clips spaced apart longitudinally of, and secured to, said mounting strip.

In use of such a section, the section may be transported in assembled condition and at the site the mounting strip may be secured directly to a building wall. The cover member may be removed for access to the wiring which remains supported on the wall by the lead support clips of the mounting strip.

The invention will now be described by way of example with reference to the accompanying partly diagrammatic drawings, in which:

FIGURE 1 is a fragmentary perspective view of a corner of a room incorporating a wiring system composed of wiring sections;

FIGURE 2 is a fragmentary perspective view of part of a wiring section according to the invention; and FIGURE 3 is a fragmentary view similar to that of FIGURE 2 of a modified wiring section.

In the room of FIGURE 1 a series of wiring sections 1, 2, 3, 4 are arranged adjacent walls of the room in end-to-end fashion. Each of the wiring sections defines ducting sections incorporating insulated flexible conductor leads 5 terminated at both ends of the section with electrical connector means 6 comprising releasable connectors matable with complementary connectors of respective leads of the adjacent sections. Lapping members 7 are provided for covering spaces between adjacent ducting sections along each wall after the electrical connectors have been interconnected. At the corner of the room a mitre section 8 is provided for lapping the adjacent ends of ducing sections 2 and 3 at the corner.

Each wiring section 1–4 comprises a cover member 9, as seen in FIGURE 2, of inverted L-section defining a skirting board cover. The skirting board member 9 is releasably connectable to a mounting member 10. The mounting member 10 comprises a mounting strip 12 having means for mounting it on a wall. For this purpose the strip is formed at intervals along its length with apertures 13 for receiving screws or rivets 14 for securing the mounting strip to a wall surface. The mounting strip 12 is provided with lead support means comprising metal plates 15 spaced apart longitudinally, and extending transversely of, the mounting strip 12, on opposite sides thereof. Each plate 15 is formed with a foot portion 16 having a turned-up end 17. The plates 15 carry a row of lead support clips 18 for releasably engaging an insulated flexible conductor lead 11, each plate carrying a respective clip. As shown, the clips 18 resiliently engage the outer sheath of a twin core lead having a pair of insulated wires 11a.

Each plate 15 also carries adjacent to the mounting strip 12 a mounting clip 19 for engaging the head of a headed lug 20 secured to the inner surface of the cover member 9.

The headed lugs comprise studs 20 having enlarged heads presenting shoulders facing towards the cover member and engageable within respective mounting cilps 19 releasably to secure the cover member 9 to the mounting member 10. The mounting clips 19 are suitably shaped so that the force required to push the stud heads into the mounting clips 19 is very much less than that required to pull the heads out of the mounting clips.

The lead 11 extends throughout the length of the cover member 9 at its ends and is terminated with electrical connectors for releasable connection with complementary connectors at the ends of respective leads of an adjacent section. Thus at one end the lead 11 is terminated by a tab receptacle 21 and at the other end is terminated with a tab 22, the tab and the receptacle being disposed within respective insulating boots 21', 22', mutually engageable to encase a connection between a tab and a receptacle within the boots 21', 22'.

In use the mounting strip is readily secured to a building wall without the need for prior location of mounting points on the wall. The apertures 13 in the mounting strip 12 define guide means for the screws or rivets 14. The cover member 9 is releasable from the mounting member 10 without disturbing the lead 11 or its interconnections. The bent-up foot portions 17 of the plates 15 collectively define a duct for receiving continuous wiring and each also defines a stand-off projection engaging a lower inner surface part of the cover member 9 to space it from the adjacent wall surface whilst the upper turned-in upper edge of the cover member 9 engages the wall surface above the plates 15.

In the embodiment of FIGURE 3 the mounting member 10 comprises two mounting strips 12 spaced apart transversely and connected by cross-members 23 secured to the mounting strips 12 at spaced intervals throughout their lengths to define a framework. The cross 23 project above the upper mounting member 10 and support a pair of elongated channel-section ducts 24 extending throughout the lengths of the mounting strips 12. A cover member 25 of greater height than the corresponding member of FIGURE 2 is employed and is suitably provided with pairs of headed studs 20 at spaced intervals for engaging respective mounting clips on the plates 15 carried by the mounting strips 12.

The wiring section of FIGURE 3 defines a sub-assembly of a wiring system which can be transported as a unit, and a series of sections are arranged end to end in a building in the general manner indicated in connection with FIGURE 1. The channel-section ducts 24 define means for supporting continuous leads such as telecommunications wiring separately from the sectionalised wiring 11. The telecommunications wiring is laid in position after positioning of the sections in a building.

The mounting strip may be of metal or of plastics material and the flexibility of the strip is adapted to accommodate minor irregularities in the wall surface.

I claim:
1. A wiring section for a wiring system comprising:
   (a) a cover member,
   (b) a mounting member comprising a mounting strip having means for mounting same on a building wall,
   (c) means for securing said cover member to said mounting member,
   (d) lead support means comprising at least one row of lead support clips spaced apart longitudinally of, and secured to, said mounting strip for releasably supporting at least one conductor lead longitudinally of mounting strip, and
   (e) at least one electrically insulated flexible electric conductor lead corresponding in length to said cover member, supported by said lead support clips, and terminated at both ends by electrical connector means for releasably establishing electrical connection between such leads and those of adjacent similar sections.

2. A wiring system as claimed in claim 1 wherein said means for securing said cover member to said mounting member comprises a plurality of headed lugs provided on one of said members and corresponding mounting clips on the other of said members releasably engaged with said lugs.

3. A wiring section as claimed in claim 2 wherein said mounting strip carries a plurality of plates spaced apart longitudinally of, and extending on either side of, said mounting strip, each of said plates having secured thereto a respective one of said mounting clips and a respective one of said lead support clips of each row thereof.

4. A wiring section as claimed in claim 1 wherein said mounting member comprises a framework including at least two of said mounting strips spaced apart transversely and connected by a plurality of longitudinally spaced cross members, said lead support means and said conductor leads being provided on each of said mounting strips.

5. A wiring section as claimed in claim 1 further comprising means for supporting continuous wiring after a plurality of said sections are mounted on a building wall, said means comprising a channel shaped duct extending longitudinally of said mounting strip.

References Cited
UNITED STATES PATENTS
2,132,400  10/1938  Curren _____ 339—23 X

FOREIGN PATENTS
365,522  12/1963  Switzerland.
932,453  7/1963  Great Britain.
577,049  5/1946  Great Britain.

LEWIS H. MYERS, Primary Examiner

D. A. TONE, Assistant Examiner

U.S. Cl. X.R.
339—23